United States Patent [19]
Beroth

[11] Patent Number: 5,282,665
[45] Date of Patent: Feb. 1, 1994

[54] PASSENGER SEAT AND PASSENGER SEAT LEG ASSEMBLY WITH ENERGY ABSORBING ZONE INCLUDING AUXILIARY CRUSH-RESISTING MEANS

[75] Inventor: Michael T. Beroth, Lewisville, N.C.

[73] Assignee: Burns Aerospace Corporation

[21] Appl. No.: 18,776

[22] Filed: Feb. 17, 1993

Related U.S. Application Data

[63] Continuation of Ser. No. 642,403, Jan. 17, 1991, Pat. No. 5,224,755.

[51] Int. Cl.⁵ .............................................. B60N 2/42
[52] U.S. Cl. .................................. 297/216.1; 297/232
[58] Field of Search ........... 297/216.1, 216.11, 216.12, 297/216.13, 216.14, 232, 445; 248/188.1

[56] References Cited

U.S. PATENT DOCUMENTS

| | | | |
|---|---|---|---|
| 3,979,149 | 9/1976 | Vogol | 297/232 |
| 4,009,780 | 7/1978 | Schmidhuber | 297/232 X |
| 4,145,081 | 3/1979 | Withors | 297/216.1 |
| 4,229,040 | 10/1980 | Howell et al. | 297/232 X |
| 4,718,719 | 1/1988 | Brennan | 297/216.1 |
| 4,861,103 | 8/1989 | Vallee | 297/232 X |
| 4,900,084 | 2/1990 | Forster et al. | 297/216.1 |
| 4,911,381 | 3/1990 | Cannon et al. | 297/216.1 X |
| 5,069,505 | 12/1991 | Amthor et al. | 297/216.1 |

Primary Examiner—José V. Chen
Attorney, Agent, or Firm—W. Thad Adams, III

[57] ABSTRACT

A passenger seat leg assembly with an energy absorbing zone. The seat includes fore and aft located legs for being fastened to a seating track mounted on a floor and fore and aft located seat-bottom support for supporting a seat bottom assembly including a cushion. The seat legs and the seat bottom supports are integrally formed with each other to define a unitary seat leg assembly. The seat leg assembly is characterized in that the fore located leg and the fore located seat bottom support diverge from each other to define an intermediate concavity and includes an integrally-formed, peripherally enclosed and laterally-extending through chamber formed in the area of the concavity to define an energy-absorbing zone. An auxiliary crush-resisting member having predetermined magnitude of resistance to crushing cooperates with the chamber to provide additional resistance to crushing. The member may be a cover plate positioned over the chamber, inserts of various designs positioned within the chamber, or both. The chamber may have two lobes, one of which holds the insert and the other of which provides an expansion zone for the insert to occupy as it is crushed.

1 Claim, 9 Drawing Sheets

PASSENGER SEAT AND PASSENGER SEAT LEG ASSEMBLY WITH ENERGY ABSORBING ZONE INCLUDING AUXILIARY CRUSH-RESISTING MEANS

This application is a continuation application of U.S. Ser. No. 07/642,403 filed Jan. 17, 1991 now U.S. Pat. No. 5,224,755.

TECHNICAL FIELD AND BACKGROUND OF THE INVENTION

This invention relates to a passenger seat and a passenger seat leg assembly which includes an energy-absorbing zone for providing controlled bending of the seat under bending stress. The invention is particularly adapted for application in connection with a machined, single piece leg assembly which includes diverging fore and aft legs and diverging fore and aft seat bottom supports. The legs are connected to a seating track in the floor and the seat bottom supports, together with other structure, support a seat bottom, including a seat cushion.

The seat disclosed in this application is intended for use in an aircraft passenger seat. Weight is a very significant factor in designing any structure for an aircraft. Weight relates directly to fuel consumption. For this reason every effort is made to design structures to be used in aircraft to be as light as possible consistent with other requirements. One of these other requirements is passenger safety. A seat could be built heavily and sturdily enough not be bend or break during an aircraft accident merely by fabricating it of heavy steel or of thick, solid aluminum. However, the weight penalty is so great that the use of such structures is economically impractical.

The prior art discloses the use of multiple-component seat frames fabricated of tubing bent into the proper shape and connected together by brackets. U.S. Pat. No. 4,718,719 discloses such a seat structure. Tubing is quite easy to bend, especially when already bent in the direction of expected further bending in case of extreme loading applied to the seat. Thus, the '719 Patent discloses the use of a curved plate which fits in the knee of the seat leg and spreads the loading along a greater portion of the length of the leg. See FIGS. 1 and 2 at 44 and 44', respectively.

Newer, unitary seat frames are not tubular but are solid metal with carefully positioned voids and areas of reduced thickness to decrease weight while maintaining adequate strength. Different problems are encountered with such seat frames, which are far more resistant to bending than tubular seat frames. Indeed, the unitary seat frames can be made so strong that substantially no bending occurs prior to actual breakage of the assembly. This is highly undesirable, since broken frame pieces could injure passengers, puncture or otherwise the degrade the integrity of fire-retardant barriers on the seats and impede passenger movement during and after an accident. In addition, the sudden breaking itself provides a rapid increase in g-forces which could also injure passengers.

FAA regulations provide limits within which seat frames must not permanently yield and higher limits within which the seat frames can yield but not fail. The seats must be made so that the fore seat bottom support and fore seat leg gradually collapse towards each other.

The prior art includes a unitary seat frame developed by applicant which includes a void in the area between the seat bottom support and leg intended to weaken the area sufficiently to provide a gradual bending and thus yielding of the leg and seat bottom support towards each other instead of sudden breaking.

This invention provides a means by which a unitary, or integrally-formed, seat frame can be constructed which maintains proper strength in the fore seat support and leg area. Gradual bending under stress is thereby maintained.

SUMMARY OF THE INVENTION

Therefore, it is an object of the invention to provide a lightweight passenger seat.

It is another object of the invention to provide a passenger seat which includes means by which the resistance to bending can be varied after manufacture.

It is another object of the invention to provide a passenger seat which includes means for increasing the resistance to bending of an integrally-formed seat frame.

These and other objects of the present invention are achieved in the preferred embodiments disclosed below by providing a passenger seat leg assembly with an energy absorbing zone. The seat includes fore and aft located legs for being fastened to a seating track mounted on a floor and fore and aft located seat-bottom support for supporting a seat bottom assembly including a cushion. The seat legs and the seat bottom supports are integrally formed with each other to define a unitary seat leg assembly. The seat leg assembly is characterized in that the fore located leg and the fore located seat bottom support diverge from each other to define an intermediate concavity and includes an integrally-formed, peripherally enclosed and laterally-extending through chamber formed in the area of the concavity to define an energy-absorbing zone providing controlled bending towards each other of the fore located seat leg and the fore located seat bottom support in the area of the chamber upon the application of bending force to the seat leg assembly. An auxiliary crush-resisting member having predetermined magnitude of resistance to crushing cooperates with the chamber to provide additional resistance to crushing.

According to one preferred embodiment of the invention, the seat leg assembly includes first and second integrally-formed enclosed chambers.

According to another preferred embodiment of the invention, at least one of the through chambers is cylindrical.

According t yet another preferred embodiment of the invention, the crush-resisting member comprises at least one cover plate for being fastened to at least one opposing side of the seat leg assembly to provide increased crush resistance to the energy absorbing zone.

According to one preferred embodiment of the invention, the crush-resistent member comprises a crush-resistent insert having a predetermined crush-resisting capacity for being positioned in the chamber for providing increased crush resistance to the energy-absorbing zone of the seat leg assembly.

Preferably, the chamber is cylindrical and the insert comprises a tubular cylindrical segment for being positioned in the chamber.

According to one preferred embodiment of the invention, the insert comprises a plurality of nested tubular cylindrical segments for being positioned in the chamber to provide increased resistance to crushing proportional to the number of segments positioned in the chamber.

According to another preferred embodiment of the invention, the insert comprises an "x"-shaped segment for being positioned in the chamber with the legs of the segment engaging the walls of the structure defining the chamber.

According to yet another preferred embodiment of the invention, the insert comprises a segment of honeycomb sandwich material.

According to one preferred embodiment of the invention, the crush-resistent members include first and second crush-resistent inserts for being positioned respectively in the first and second chambers and first and second cover plates for being mounted to the seat leg assembly surrounding the first and second chambers for enclosing the inserts within the chambers According to one preferred embodiment of the invention, the chamber includes a narrowed waist defining on opposite sides thereof first and second enlarged chamber lobes, said first lobe having opposed walls for supporting therebetween said crush-resisting member.

Preferably, the crush-resisting member is a tubular cylindrical segment and the opposed walls of the first lobe are arcuate to matingly receive the insert. When crushed, the insert can expand into the second chamber lobe.

According to yet another preferred embodiment of the invention, a passenger seat is provided including a seat bottom, a seat back, first and second laterally spaced-apart arm rests and first and second spaced-apart seat leg assemblies with respective energy absorbing zones, each of the leg assemblies defined as set out above.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
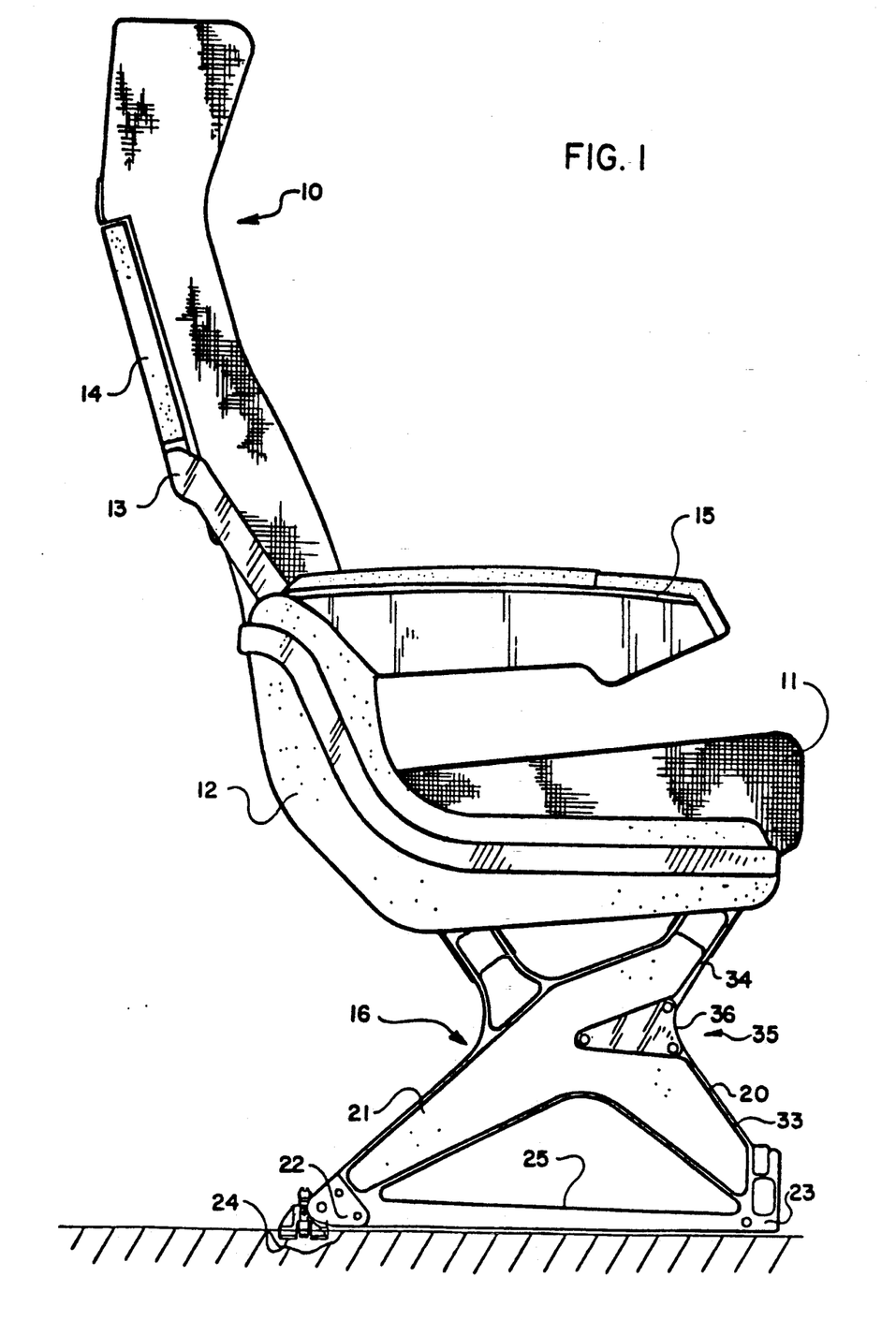
FIG. 1 is a side elevation of a passenger seat according to an embodiment of the invention.

Referring now specifically to the drawings, a passenger seat according to the present invention is illustrated in FIG. 1 and shown generally at reference numeral 10. Seat 10 includes a seat bottom 11, a seat bottom frame 12, a moveable seat back 13, a seat back tray assembly 14 and a pair of side arm rests 15. The above-named seat components are mounted on and carried by a pair of spaced-part seat leg assemblies 16. Seat leg assemblies 16 each include fore and aft legs 20 and 21, the ends of which carry connectors 22 and 23, respectively, for attachment to a seating track 24 which is securely fastened to the deck of the aircraft. The ends of legs 20 and 21 are connected together by a stretcher member 25 which extends between the two legs 20 and 21 parallel with the deck of the aircraft.

Figure 2:
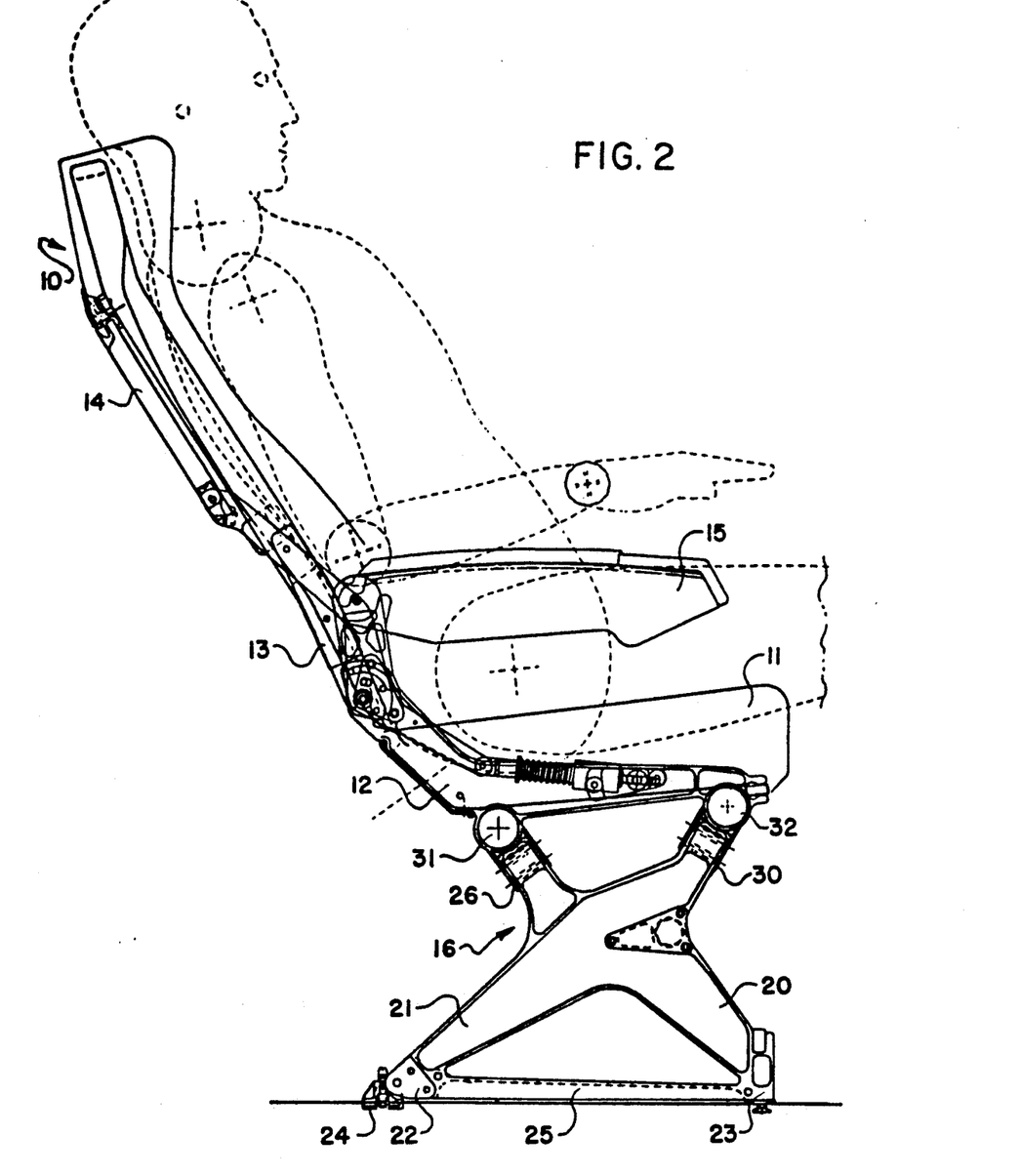
FIG. 2 is a schematic side elevation with parts broken away of the passenger seat shown in FIG. 1.

Referring now to FIG. 2, each seat leg assembly 16 has fore and aft seat bottom supports 26 and 30, the upper ends of which carry respective stretcher tubes 31 and 32 which extend laterally between adjacent leg assemblies 16. According to the preferred embodiment of the invention, seat leg assembly 16 is machined from aircraft grade aluminum, such as material designation 2024-T235. The seat leg assembly is therefore a single, integrally-formed structure in the shape of an irregular "x". The periphery of the seat leg assembly 16 is provided with a predetermined thickness for proper rigidity and strength, with the interior portions of the assembly being of lesser thickness to reduce weight.

Figure 3:
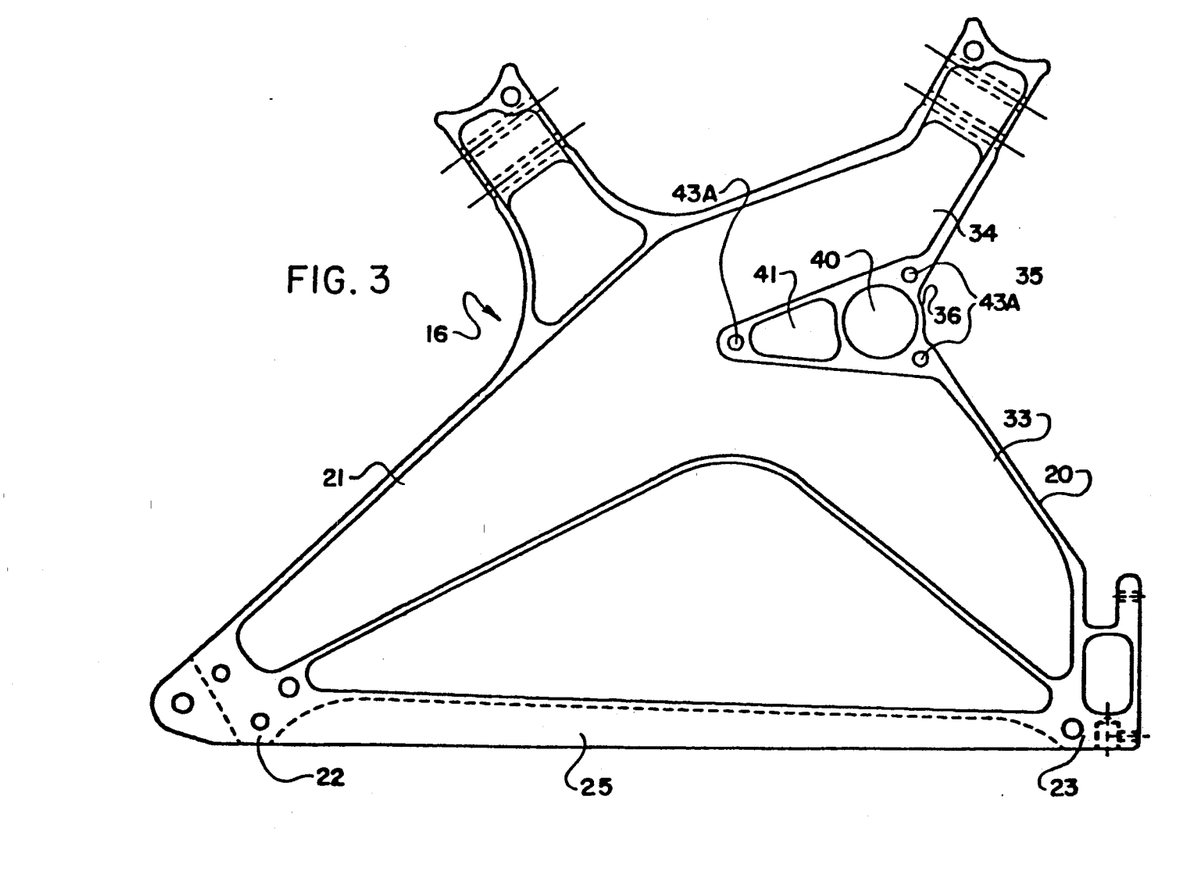
FIG. 3 is a side elevation of a seat leg assembly according to an embodiment of the invention.

Referring more specifically to FIG. 3, fore leg 33 and the fore seat bottom support 34 the seat leg assembly are formed in a forwardly diverging configuration to define between them a concave area generally designated at broad reference numeral 35. This concave area 35 defines an energy absorbing zone more specifically designated at 36. This zone 36 includes first and second chambers 40 and 41. Chambers 40 and 41 extend laterally through seat leg assembly 16 from one side to the other and are completely enclosed around their respective peripheries. As is shown, the forwardmost chamber 40 is cylindrical, while the rearwardmost chamber 41 is generally in the shape of a truncated triangle.

Figure 4:
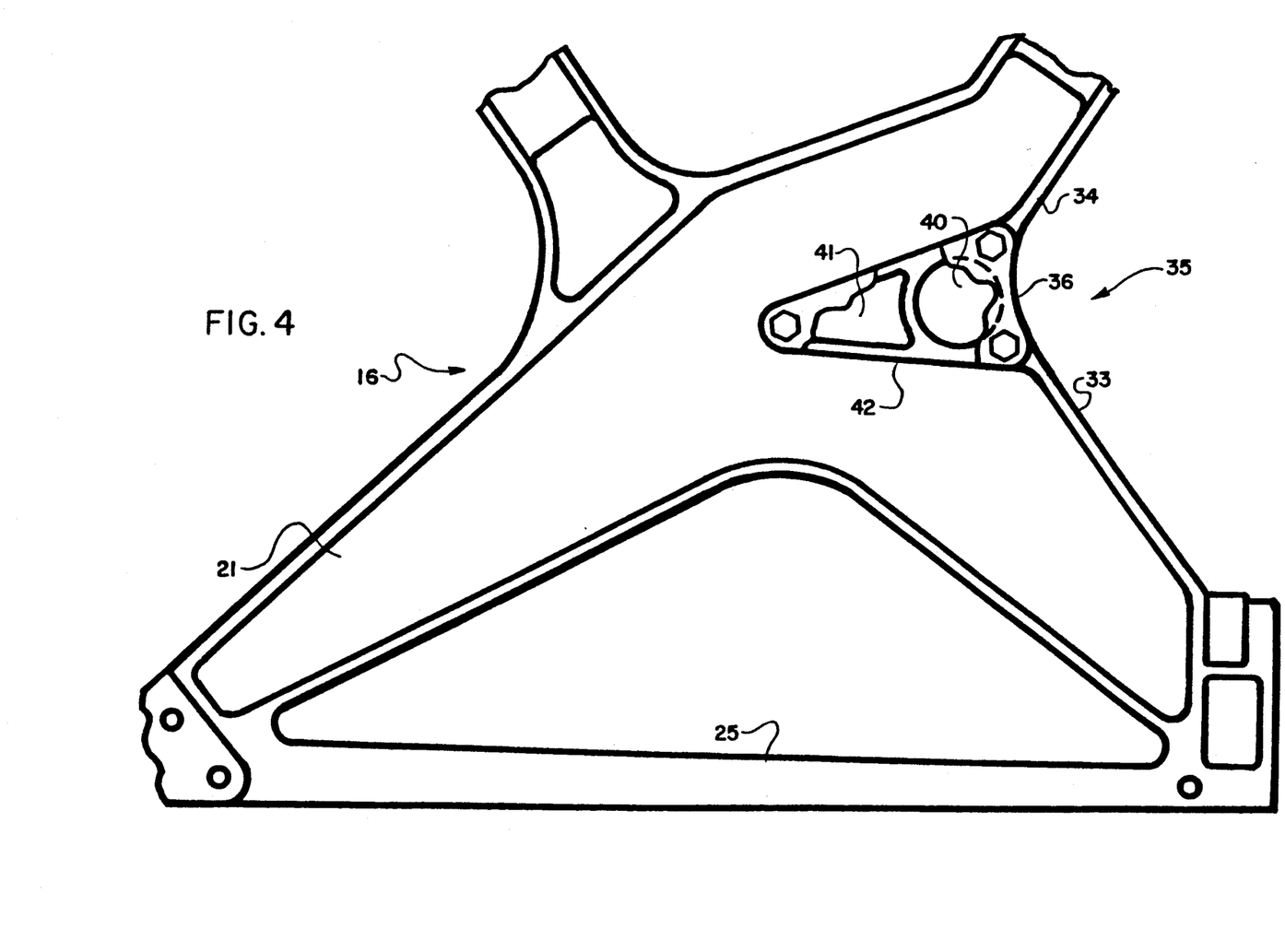
FIG. 4 is a fragmentary enlarged side elevation view of the energy absorbing zone area of the seat leg assembly.

As is best shown in FIG. 4, the energy absorbing zone 36 is positioned so that severe downward g-loading on the fore seat bottom support 34 will drive it and the fore seat leg together. The chambers 40 and 41 provide areas of increased flexibility with sufficient remaining strength to cause the two elements to progressively yield in a gradual, controlled and predictable manner. Chambers 40 and 41 also somewhat reduce the weight of the seat leg assembly 16.

Greater resistance to crushing is provided by one of three means.

Figures 5, 6A, 6B:
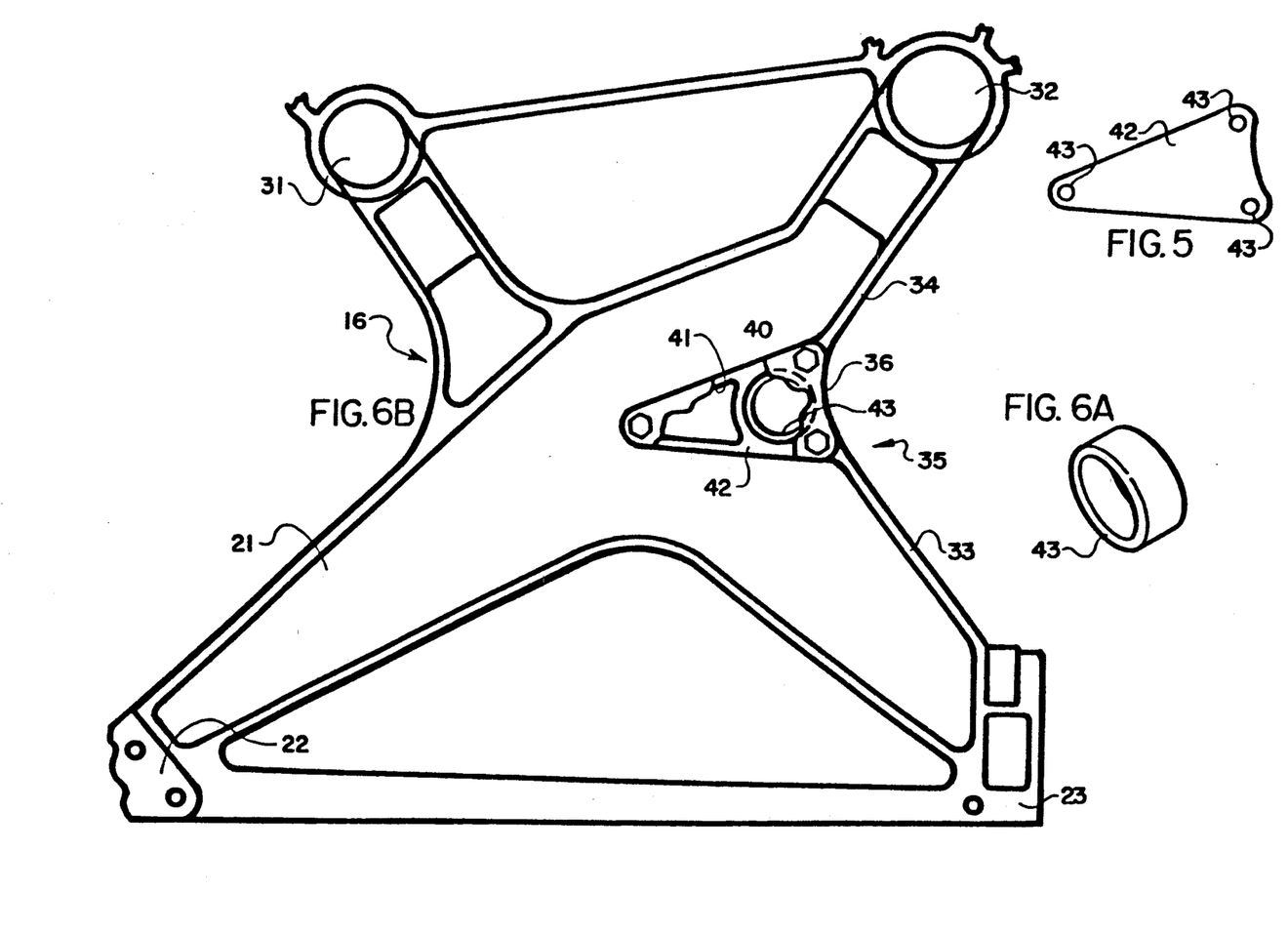
FIG. 5 shows a cover plate used as a crush resisting member and to cover the chamber.
FIG. 6A is a perspective view of a tubular crush-resisting insert according to one embodiment of the invention.
FIG. 6B shows the insert of FIG. 6A in place in the chamber.

First, a cover plate 42, as is shown in FIG. 5, can be placed over one or both sides of chambers 40 and 41, as is shown in FIGS. 1 and 2. This is accomplished by providing screw holes 43 (see FIG. 3) in cover plate 42 and mating screw holes 43A in the walls of the seat leg assembly surrounding chambers 40 and 41. Cover plate 42 is formed from flat aluminum sheet and its thickness can be controlled to provide a desired degree of additional rigidity to seat leg assembly 16 and thus resistance to yielding of the fore seat bottom support and fore seat leg towards each other.

Second, inserts can be placed in one or both of the chambers 40 and 41. The inserts may be shaped and sized to fit snugly against the walls of the seat leg assembly defining the chambers 40 and 41, or they may contact the walls only at certain places.

By way of illustration, a tubular aluminum insert 43 is shown in FIG. 6A. Insert 43 has an axial dimension substantially the same as the axial dimension of cylindrical chamber 40 and is sized to form a press fit into the chamber 40, as is shown in FIG. 6B.

Figures 7A, 7B:
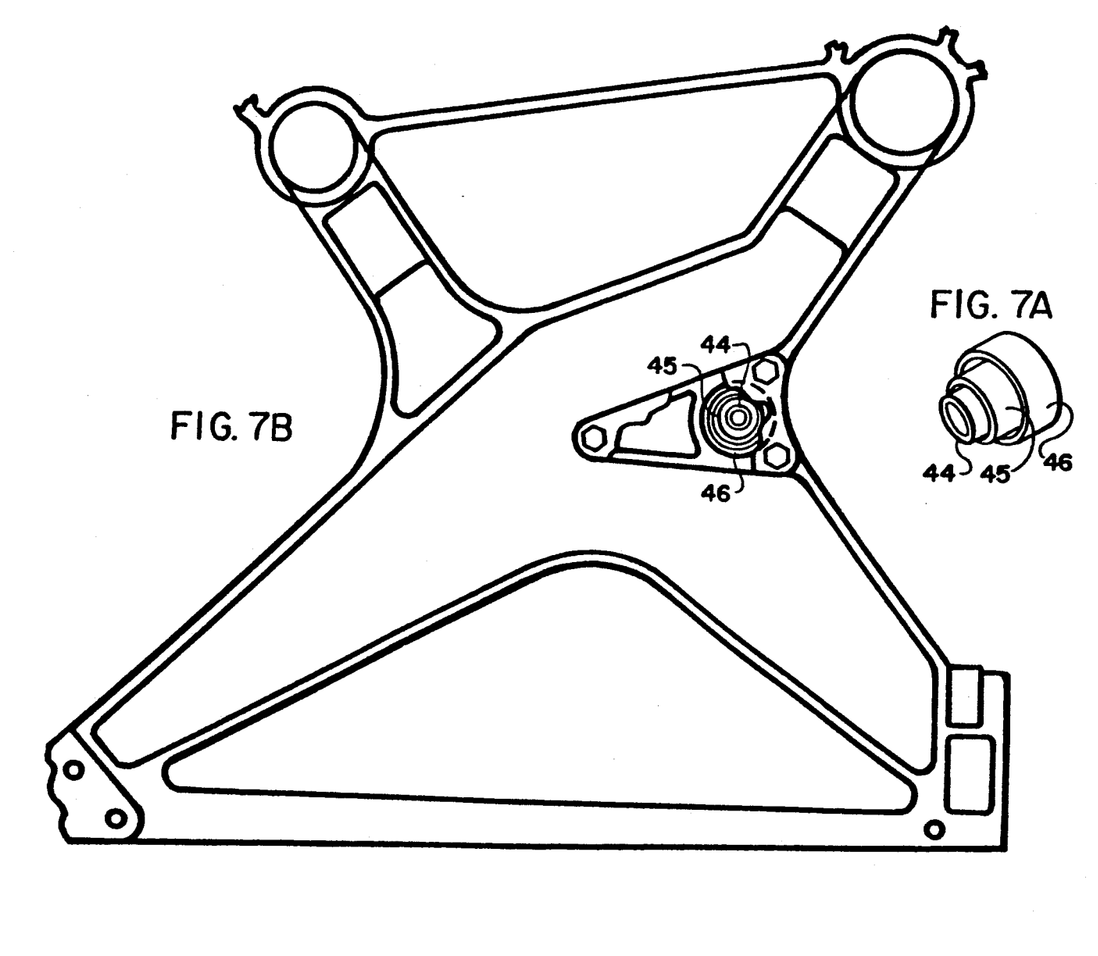
FIG. 7A is a perspective view of nested tubular crush-resisting inserts according to one embodiment of the invention.
FIG. 7B shows the inserts of FIG. 7A in place in the chamber.

A series of nested tubular aluminum inserts 44, 45 and 46 are shown in FIG. 7A. The nested inserts 44, 45 and 46 are positioned in chamber 40, the largest insert 46 sized to form a press fit into the chamber 40, as is shown in FIG. 7B. The number and thickness of the inserts can be varied as needed to provide precisely the degree and rate of yielding desired.

Figures 8A, 8B:
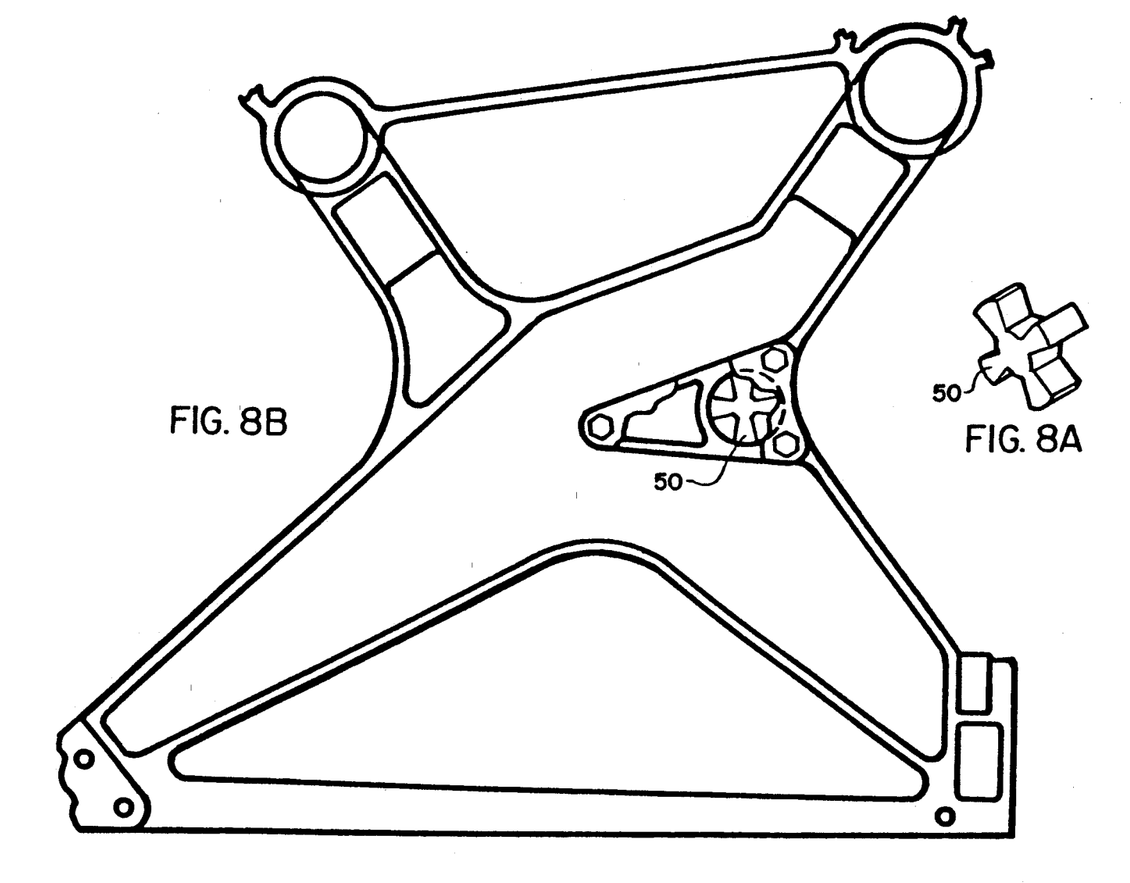
FIG. 8A is a perspective view of an x-shaped crush-resisting insert according to one embodiment of the invention.
FIG. 8B shows the insert of FIG. 8A in place in the chamber.

As is shown in FIG. 8A, an x-shaped insert 50 may be utilized, the size of the insert 50 being such that the ends of the legs of the insert engage the walls of the seat leg assembly defining the chamber 40. This is shown in FIG. 8B. The legs of the insert 50 will resist deformation of the chamber 40 to a degree dependant on the thickness of its structure.

Figures 9A, 9B:
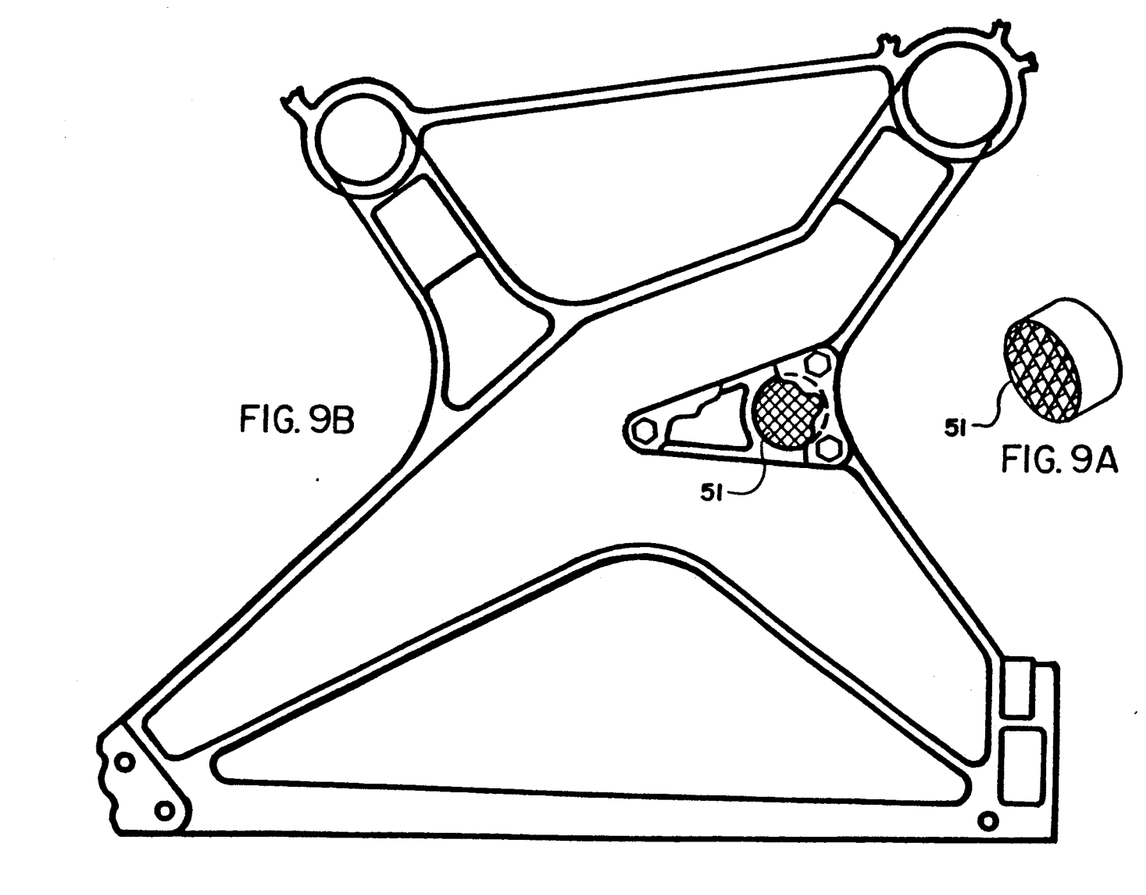
FIG. 9A is a perspective view of a cylindrical shaped crush-resisting insert constructed of honeycomb material according to one embodiment of the invention.
FIG. 9B shows the insert of FIG. 9A in place in the chamber.

An insert 51 is shown in FIG. 9A, where aluminum "honeycomb", a structural material known for a very high strength-to-weight ratio, is formed into a cylindrical "plug" which is fitted into chamber 40. Again, the honeycomb insert 51 will resist deformation of the chamber 40 to a degree dependant on its structure.

Many other shapes and materials can be utilized to provide the exact degree of yielding needed, and which will achieve the greatest reduction in weight.

Third, the cover plate 42 illustrated in FIG. 5 can be used in combination with the inserts illustrated in FIGS. 6A, 7A, 8A, and 9A, with the preferred inserts being placed in chamber 40 and then enclosed within chamber 40 by securing first and second cover plates 42 over both sides of chamber 40, and securing them in place with screws.

As mentioned above, inserts and/or cover plates can also be provided for the rearwardmost chamber 41 according to the above-described principles.

Figures 10, 11:
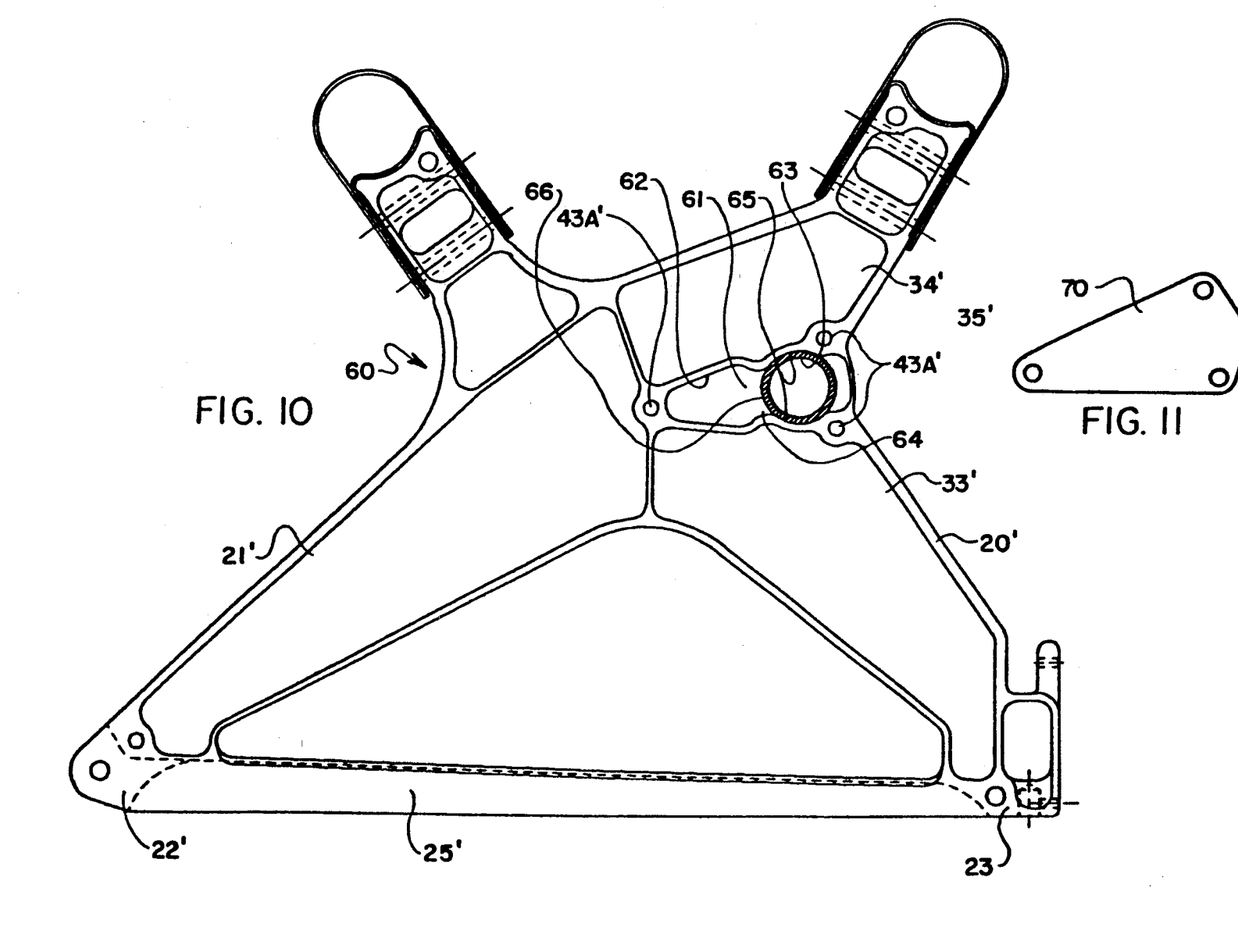
FIG. 10 is a side elevation of a seat leg assembly according to another embodiment of the invention.
FIG. 11 shows a cover plate used as a crush resisting member and to cover the chamber of the embodiment shown in FIG. 10.

The preferred embodiment of the seat leg assembly is illustrated in FIG. 10 and illustrated at broad reference numeral 60. Like elements in the embodiment shown in FIGS. 1-4 and 6B-9B, and the preferred embodiment shown in FIG. 10 are shown in FIG. 10 in prime notation, the description of which is incorporated by reference. Seat leg assembly 60 includes a chamber 61 which is formed in the structure of the seat leg assembly 60 in the area of the concavity 35'. Chamber 61 includes two enlarged lobes 62 and 63 with a narrowed waist 64 between them. The opposing walls 65 of the chamber lobe 63 are arcuate and provide opposing support for a tubular cylindrical insert 66. The insert 66 is preferably steel, and its wall thickness is preferably 90 thousands of a inch to provide resistance to crushing of approximately 1,800 pounds. As is shown in FIG. 10, voids remain on opposite sides of insert 66 to permit room for deformation of insert 66 as crushing occurs.

Various other types of inserts such as shown in FIGS. 7A-9A may also be used in the manner described above.

Chamber 61 may be enclosed on opposite sides by cover plates 70 a shown in FIG. 11 in the manner described above with particular reference to FIG. 5.

In the embodiments disclosed above, the seat leg assembly at its thickest part is 1 and ¼ inches thick. The intermediate web areas are ⅛ inches thick.

A passenger seat and a seat leg assembly for a passenger seat is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A passenger seat leg assembly with an energy absorbing zone, comprising:
    (a) fore and aft located legs for being fastened to a seating track mounted on a floor;
    (b) fore and aft located seat-bottom support for supporting a seat bottom assembly including a cushion;
    (c) said seat legs and said seat bottom support integrally formed with each other to define a single unit seat leg assembly, said seat leg assembly being characterized in that the fore located leg and the fore located seat bottom support diverge from each other to define an intermediate concavity;
    (d) said seat leg assembly including at least one integrally-formed, peripherally enclosed and laterally-extending through chamber formed in the seat legs in the area of the concavity to define an energy-absorbing zone providing controlled bending towards each other of the fore located seat leg and the fore located seat bottom support in the area of the chamber upon the application of bending force to the seat leg assembly; and
    (e) an auxiliary crush-resisting member having predetermined magnitude of resistance to crushing positioned in and cooperating with said chamber to provide additional resistance to crushing.

* * * * *